United States Patent [19]

Lindgren et al.

[11] Patent Number: 5,034,272

[45] Date of Patent: Jul. 23, 1991

[54] DECORATIVE THERMOSETTING LAMINATE

[75] Inventors: Kent O. Lindgren; Alf H. Hasselqvist, both of Perstorp; Roland K. A. Larsson, Anderslöv, all of Sweden

[73] Assignee: Perstorp AB, Perstorp, Sweden

[21] Appl. No.: 397,839

[22] Filed: Aug. 24, 1989

[30] Foreign Application Priority Data

Aug. 25, 1988 [SE] Sweden ................................. 8802982

[51] Int. Cl.$^5$ .................. B32B 5/16; B32B 31/00; D21H 5/00; B44F 1/00
[52] U.S. Cl. ..................................... 428/331; 428/332; 428/531; 428/535; 428/918; 428/156; 428/60; 428/222
[58] Field of Search ............... 428/331, 330, 531, 535, 428/418

[56] References Cited

U.S. PATENT DOCUMENTS 3,294,622 12/1966 Wark.

FOREIGN PATENT DOCUMENTS 0249583 12/1987 European Pat. Off..
2362645 9/1974 Fed. Rep. of Germany.

Primary Examiner—P. C. Sluby
Attorney, Agent, or Firm—Stevens, Davis, Miller & Mosher

[57] ABSTRACT

A decorative thermosetting laminate with an extremely increased abrasion resistance comprising a base layer and at least two patterned decor sheets of paper impregnated with a thermosetting resin and firmly bonded to the base layer. The paper material of these decor sheets is transparent. These sheets are provided with the same pattern and placed on top of each other in such a manner that the corresponding parts of the pattern of the sheets coincide at least mainly but preferably fully with each other, whereby the pattern at abrasion of one decor sheet will be repeated in the next decor sheet.

12 Claims, No Drawings

DECORATIVE THERMOSETTING LAMINATE

The present invention relates to a thermosetting laminate with extremely increased abrasion resistance.

Decorative thermosetting laminates are well-known and are used, for instance as covering materials for walls, cupboard doors, desktops, tabletops, and for other furniture and as flooring materials.

Such laminates are often made by the lamination under heat and pressure of two to seven kraft paper sheets impregnated with phenol-formaldehyde resin, a monochromatic or patterned decor paper sheet impregnated with melamine-formaldehyde resin and a fine so-called overlay sheet of α-cellulose impregnated with melamine - formaldehyde resin.

The overlay sheet is intended to protect the decor paper sheet from abrasion. In certain cases the overlay sheet is omitted.

There are also laminates consisting of a base layer of particle board or fiber board provided with such a decor paper sheet and possibly an overlay sheet. These sheets can be laminated towards the base layer under heat and pressure. If a decor paper sheet only and no overlay sheet is used, the decor paper sheet can be glued towards the base layer instead.

The laminates have many good properties. However, it has turned out that there is a great need to improve the abrasion resistance of the laminates exposed to an extreme abrasion. This is especially true in the case of floor laminates but to a certain extent also for laminates for desktops and tabletops.

It has been tried before to improve the abrasion resistance of these laminates by the addition of small, hard particles, for instance aluminum oxide, during the production of the overlay paper of α-cellulose. Then the particles have been spread over a layer of wet α-cellulose fibers on the wire of a paper machine.

In said method the particles are distributed more or less irregularly within the whole fiber layer. Some of these particles even pass through the wire. Thus, in the overlay paper obtained, the hard particles will be distributed in an uncontrollable way. It is impossible by this known method to get an even distribution of the hard particles on the surface of the paper, where they give the best effect against abrasion.

In other words the laminates obtained containing such an overlay sheet will have uneven qualities with respect to abrasion resistance.

In U.S. Pat. No. 4,940,503, a decorative thermosetting laminate with an abrasion resistant surface layer is disclosed. The laminate comprises at least one paper sheet placed as the uppermost sheet or rather close to the surface of the laminate. Said sheet had been impregnated with a thermosetting resin, preferably melamine-formaldehyde resin, coated with small dry hard particles evenly distributed over the resin coated surface, whereupon the resin had been dried.

Then the particle coated paper sheet consists of the decor sheet or the so-called overlay paper, which is often made of α-cellulose. In certain cases both an overlay paper and a decor paper coated with particles in said way can be used.

In U.S. Pat. No. 4,940,503 only one decor sheet is used in the usual way.

The laminate disclosed gets a far better abrasion resistance than the previously known decorative laminates. However, there is a need to be able to produce laminates with even better abrasion resistance, for instance as flooring material in public premises, elevators or the like.

Previously it has not been considered to be possible to satisfy this need. However, by a new revolutionary way of thinking it has now, according to the present invention, been possible to produce a decorative thermosetting laminate with extremely increased abrasion resistance. Said laminate comprises a base layer and at least two patterned decor sheets of paper impregnated with a thermosetting resin and firmly bonded to the base layer.

The paper material of these decor sheets is transparent. The sheets are provided with the same pattern and they are placed on top of each other in such a manner that the corresponding parts of the pattern of the sheets coincide at least mainly but preferably fully with each other, whereby the pattern at abrasion of one decor sheet will be repeated in the next decor sheet.

The use of two or more decor sheets in this way in a decorative thermosetting laminate according to the invention is quite brilliant. Previously, usually only one decor sheet has been used. Different methods for the protection of the pattern of this decor sheet against abrasion have been suggested as mentioned above. However, once the pattern had been abrased the laminate had to be exchanged.

In the European patent publication 0249583 a laminate comprising a core of a large number of substantially translucent sheets of α-cellulose and rayon fibers is disclosed. In the embodiment examples 50 such sheets are used to give an opalescent decorative effect to the laminate. No decorative sheet is used in two of the examples while one conventional decorative sheet is used in the last example, where said sheet is placed with 25 translucent α-cellulose sheets on each side.

It is mentioned in the above European patent application that at least some of the translucent sheets may be printed. However, there is no disclosure of arranging these printed sheets in such a way that the pattern of the sheets coincide.

Instead the main idea according to said patent seems to be the use of a core of a large number of translucent sheets to get a decorative opalescence in the laminate.

In order to get the present invention to work the paper material of the decor sheets must be transparent. Preferably it is made of α-cellulose.

When the pattern on the first transparent decor paper in the laminate has been worn out, the pattern of the next decor sheet will be seen through the first transparent decor paper and so on. In this way abrasion through the laminate will go on and nobody will notice that the pattern has worn out.

The conventional decor papers used before during the production of decorative thermosetting laminates cannot be used according to the present invention. They are not transparent but are made of a simpler kind of paper containing fillers etc. This usual non-transparent paper would cover the pattern of a decor sheet situated below and thereby destroy the continuity of the pattern through the different decor sheets.

In order to get the best aesthetic effect the pattern of the different decor sheets should be placed in such a way that the corresponding parts of the pattern of the different decor sheets coincide fully with each other.

At the use of two or more decor sheets according to the invention it is possible to arrange the pattern in such a manner that a deep effect, a three-dimensional appearance is obtained.

In certain cases an acceptable quality of the pattern in the laminate can be achieved even if the pattern of the different decor sheets do not coincide exactly but are a bit displaced in relation to each other.

The decor sheets can also be monochromatic. Then, of course, the need to place the decor sheets with coinciding pattern will disappear.

Of course the extremely increased abrasion resistance will be obtained also if monochromatic decor sheets are used.

The transparent paper used for the decor sheets is preferably calandered or prepared in another way to make the printing possible.

The laminate can also contain natural, unpatterned, transparent paper sheets. These can be placed between the decor sheets. Often there is also at least one unpatterned transparent paper sheet as a so-called overlay constituting the top layer in the laminate.

The patterned and unpatterned, transparent α-cellulose paper respectively can be treated to give the laminate extra abrasion resistance. Then the paper can be impregnated with a thermosetting resin, preferably melamine-formaldehyde resin, coated with small, hard particles evenly distributed over the resin coated surface, whereupon the resin is dried.

The hard particles can consist of many different materials. It is especially suitable to use silica, aluminum oxide and/or silicon carbide. Thus, a mixture of two or more materials is possible.

The size of the particles is important for the final result. If the particles are too big the surface of the laminate will be rough and unpleasant. On the other hand too small particles can give too low abrasion resistance. Suitably the average particle size is about 1-80 μm, preferably about 5-60 μm.

Also other methods for increasing the abrasion resistance of the paper sheets can be used within the scope of the present invention.

The base layer can consist of particle board or fiber board, whereby the transparent decor sheets and any possible unpatterned transparent paper sheets are bonded to the base layer by gluing or by heat and pressure. The base layer can also consist of one or more paper sheets, impregnated with a thermosetting resin. These sheets are bonded together and to the other paper sheets by curing under heat and pressure. Usually phenol-formaldehyde resin is used for the impregnation of the paper sheets in the base layer. There is no need for these sheets to be transparent. Therefore usual non-transparent kraft paper sheets are preferred.

It is self-evident that the invention is not limited to laminates made of paper sheets containing melamine-formaldehyde resin and phenol-formaldehyde resin. Also other thermosetting resins such as phenol-urea-formaldehyde resin and polyester resin can be used.

The very lowest decor sheet in the laminate can consist of a conventional non-transparent paper which can be monochromatic or patterned.

The invention will be explained further in connection with the embodiment examples below. Example 1 shows the production of a conventional decorative thermosetting laminate without any special abrasion preventing additives. According to example 2, a special known overlay paper was used, where small hard particles had been added to the paper fibers already during the production of the paper. Example 3 illustrates a process according to one embodiment of the invention protected by the Swedish patent application 8800550-9.

Examples 4 and 5 show a variation of the process according to example 1, where a larger number of so-called overlay sheets of α-cellulose were used. Thus, examples 1-5 relate to comparison tests outside the scope of the present invention. Examples 6-12 illustrate different embodiments of the laminate according to the invention.

EXAMPLE 1

A roll of transparent so-called overlay paper of α-cellulose with a surface weight of 40 g/m$^2$, was impregnated with a solution of melamine-formaldehyde resin to a resin content of 70 percent by weight calculated on dry impregnated paper. The impregnated paper web was then fed continuously into a heating oven where the solvent was evaporated. At the same time the resin was partially cured to the so-called B-stage. Usually the product obtained is called a prepreg. The paper web was cut to sheets having a suitable length. The sheets were then automatically stacked on top of each other.

A roll of conventional non-transparent so-called decor paper with a surface weight of 80 g/m$^2$ and provided with a printed decor pattern was treated in the same way as the overlay paper. The resin content was 48 percent by weight calculated on dry impregnated paper.

A roll of kraft paper with a surface weight of 170 g/m$^2$ was also treated in the same way with the exception that the resin consisted of phenol-formaldehyde resin instead of melamine-formaldehyde resin. The resin content was 30 percent calculated on dry impregnated paper.

Three of the above prepreg sheets impregnated with phenol-formaldehyde resin (so-called core paper), one decor paper and an overlay paper were placed between two press plates. These sheets were pressed in a conventional multi-opening press at a pressure of 90 kp/cm$^2$ and a temperature of 145° C for 45 minutes to produce a homogenous decorative laminate.

The abrasion resistance of the laminate obtained was tested according to the ISO-standard 4586/2 -83 by means of an apparatus called a Taber Abraser, model 503. According to said standard the abrasion of the decor layer of the finished laminate is measured in two steps. In step 1 the so-called IP-point (initial point) is measured, where the starting abrasion takes place.

In step 2 the so-called EP-point (end-point) is measured, where 95 % of the decor layer has been abrased.

Moreover, the above ISO-standard stipulates that the number of revolutions obtained with the test machine in step 1 and step 2 are added, together the sun obtained is divided by 2. Thereby, the 50 percent point for abrasion is obtained, which is normally reported in standards and off-prints.

However, in the present and the following examples only the IP-point is used.

In testing the above laminate a value of 200 revolutions was obtained for the IP-point, which is normal for a decorative laminate without any reinforcement of the abrasion layer.

EXAMPLE 2

In a paper mill an α-cellulose overlay paper was manufactured with a surface weight of 40 g/m$^2$ by feeding suspended α-cellulose fibers from the head box to the wire of a paper machine. Aluminum oxide particles with an average particle size of about 50 μm were applied to the upper side of the wet fiber layer in an amount of 3 g/m².

At the subsequent manufacture of the overlay paper the hard particles were distributed more or less irregularly within the whole paper. Some particles landed close to the surface, some near to the middle and some in the lower part of the paper. Certain particles even passed through the whole fiber layer and out of the wire. Thus, the were not left in the finished paper.

The overlay paper produced was impregnated with the same amount of melamine-formaldehyde resin and thereafter treated also as to the rest in the same way as according to Example 1.

A laminate was produced with the same number of sheets and the same construction as disclosed in Example 1. The pressing took place under the same conditions too.

The abrasion resistance of the laminate obtained was tested in the same way as according to Example 1. An IP-value of 600 revolutions was obtained.

EXAMPLE 3

The process according to Example 1 was repeated except that immediately after the impregnation of the transparent α-cellulose paper but before the drying, aluminum oxide particles with an average particle size of about 50 μm were applied to the upper side of the paper in an amount of 3 g/m².

Thus, the aluminum oxide particles were applied in the melamine-formaldehyde resin, which had not dried yet.

During the subsequent drying the particles were enclosed in the resin layer and consequently concentrated to the surface of the prepreg produced. The overlay sheet was placed with the particle coated side upwards in relation to the decor paper. The abrasion resistance of the laminate produced was tested in the same way as according to Example 1. An IP-value of 2000 revolutions was measured.

EXAMPLE 4

The process according to Example 1 was repeated except that also two, three, six and ten sheets respectively of α-cellulose were used instead of one such sheet.

The abrasion resistance of the laminates obtained was tested in the same way as in Example 1.

The following values were obtained:

| For one sheet of α-cellulose | IP = 200 revolutions |
| For two sheets of α-cellulose | IP = 450 revolutions |
| For three sheets of α-cellulose | IP = 900 revolutions |
| For six sheets of α-cellulose | IP = 1 300 revolutions |
| For ten sheets of α-cellulose | IP = 5 200 revolutions |

Accordingly the abrasion resistance increases as the number of α-cellulose sheets increases. However, the pattern of the pressed decorative laminates was not attractive any more. The higher the number of α-cellulose sheets which had been put on top of each other the hazier and the more indistinct the decor sheet situated underneath appeared.

Therefore, the decorative laminates produced did not meet the requirement of quality of the pattern. Moreover, the abrasion resistance obtained was not high enough to permit the use of the laminate in an extremely abrasion resistant environment.

EXAMPLE 5

The process according to Example 4 was repeated except α-cellulose sheets from Example 3 were used instead of the α-cellulose sheets from Example 1.

Decorative laminates were produced according to Example 1 except one, two, three, six and ten sheets respectively of α-cellulose with hard particles according to Example 3 were used.

The abrasion resistance of the laminates obtained was tested in the same way as in Example 1.

The following values were obtained:

| For one sheet of α-cellulose with hard particles | IP = 2 000 rev. |
| For two sheets of α-cellulose with hard particles | IP = 6 000 rev. |
| For three sheets of α-cellulose with hard particles | IP = 9 000 rev. |
| For six sheets of α-cellulose with hard particles | IP = 20 000 rev. |
| For ten sheets of α-cellulose with hard particles | IP = 40 000 rev. |

Thus, the abrasion resistance increases drastically when the number of sheets of α-cellulose with hard particles is increased. However, the higher the number of α-cellulose sheets which had been put on top of each other the hazier and the more indistinct the decor sheet situated underneath appeared.

The laminates produced met the very high requirements on abrasion resistance but they did not meet the requirement of quality of the pattern, due to the haziness.

EXAMPLE 6

A roll of transparent paper of α-cellulose calandered to a Beck number of about 100 seconds and with a surface weight of 40 g/m² was provided with a printed decor pattern by means of the so-called Rotary Screen method.

Another such paper roll was provided with a printed decor pattern by means of photogravure printing.

The two paper rolls with printed pattern were impregnated with a solution of melamine-formaldehyde resin to a resin content of 45 percent by weight calculated on dry impregnated paper.

The two rolls of impregnated paper were then fed continuously into a heating oven, where the solvent was evaporated. At the same time the resin was partially cured to the so-called B-stage. Usually the product obtained is called a prepreg.

The paper webs were cut to sheets having a suitable length. Then the sheets were stacked automatically on top of each other.

The decor sheets obtained, which had been printed by the Rotary Screen method, were then combined with the natural transparent α-cellulose sheets containing hard particles disclosed in Example 3.

The sheets were put on top of each other in such a way that every second sheet was a natural c-cellulose sheet containing hard particles and every second sheet was a decor sheet.

The decor sheets were placed in such a manner that the corresponding parts of the pattern on the different sheets were situated exactly above each other. Thus, the same pattern was repeated exactly through all the decor sheets.

The following combinations were pressed in the same way as according to Example 1 together with three core paper sheets impregnated with phenol-formaldehyde resin at the bottom:
a) 3 natural α-cellulose sheets with hard particles and 3 decor sheets were placed on top of each other, every second one of each kind with an α-cellulose sheet containing hard particles on the top.
b) in the same way as a) but with 5 natural α-cellulose sheets with hard particles and 5 decor sheets placed on top of each other, every second one of each kind with a natural α-cellulose sheet containing hard particles on the top.
c) in the same way as a), but with 10 natural α-cellulose sheets with hard particles and 10 decor sheets placed on top of each other, every second one of each kind with a natural α-cellulose sheet containing hard particles on the top.

The abrasion resistance of the decorative laminates obtained was tested in the same way as in Example 1. The following values were obtained:

|     |         |                         |
| --- | ------- | ----------------------- |
| (a) | 3 + 3   | IP = 8 000 revolutions  |
| (b) | 5 + 5   | IP = 20 000 revolutions |
| (c) | 10 + 10 | IP = 40 000 revolutions |

In all these alternatives a considerably higher abrasion resistance was obtained than for previously known decorative thermosetting laminates. However, the alternatives b) and c) gave absolutely exceptional abrasion resistance.

Also in respect to the design a fully acceptable pattern was obtained. It had a nice deep effect.

The laminate is very suitable as a flooring material where the abrasion is extremely high. By the above pattern adapted stacking of the decor sheets the original pattern will be kept during the whole life of the floor in spite of the abrasion taking place on its surface.

EXAMPLE 7

The process according to Example 6 was repeated except that the decor sheets were used which had been printed by photogravure printing. The same values with respect to abrasion resistance as according to Example 6 were obtained. The patterns became as fine as the laminates produced according to Example 6.

EXAMPLE 8

A roll of transparent paper of α-cellulose calandered to a Beck number of about 100 seconds was provided with a printed decor pattern by means of the so-called Rotary Screen method.

Another such paper roll was provided with a printed decor pattern by means of photogravure printing.

The two paper rolls were impregnated with a solution of melamine-formaldehyde resin to a resin content of 45 percent by weight calculated on dry impregnated paper.

Immediately after the impregnation, but before the drying of the melamine-formaldehyde resin, hard aluminum oxide particles with an average particle size of 45 μm were applied to the upper side of the paper in an amount of 3 g/m².

The two rolls of impregnated paper were then fed continuously into a heating oven, where the solvent was evaporated. At the same time the resin was partially cured to the so-called B-stage. Usually the product obtained is called a prepreg.

The paper webs were cut into sheets having a suitable length. Then the sheets were stacked automatically on top of each other.

The decor sheets obtained which had been printed by the Rotary Screen method were then combined with the natural transparent α-cellulose sheets containing hard particles disclosed in Example 3.

The decor sheets and the transparent α-cellulose sheet containing hard particles were laminated in the same way as according to Example 1 together with three core paper sheets at the very bottom impregnated with phenol-formaldehyde resin.

The following combinations were pressed:
a) on the top a natural, transparent α-cellulose sheet containing hard particles and under said sheet 3 decor sheets containing hard particles. The decor sheets were placed in such a way that the corresponding parts of the pattern on the different sheets were situated exactly over each other.
b) in the same way as a) but with 5 decor sheets.
c) in the same way as a) but with 10 decor sheets.

The abrasion resistance of the decorative laminates obtained were tested in the same way as in Example 1. The following values were obtained:
a) 1+3 IP = 7 500 revolutions
b) 1+5 IP = 18 000 revolutions
c) 1+10 IP = 39 000 revolutions On the whole the abrasion resistance was unchanged as compared with the result of the corresponding tests according to Example 6, in spite of the fact that all but one of the unpatterned natural α-cellulose sheets with hard particles had been omitted.

The other results were also unchanged as compared with Example 6.

By omitting so many natural α-cellulose sheets the content of the melamine resin in the surface layer of the laminate was decreased to less than 50 percent in comparison with the process according to Example 6. This results in laminates which are not so brittle have a decreased the tendency to become unlevel (curved).

EXAMPLE 9

The process according to Example 8 was repeated except that the decor sheets which had been printed by photogravure printing were used. The same results as in Example 8 were obtained in all aspects.

EXAMPLE 10

The process according to Example 8 was repeated except that one underlay sheet (U-sheet) of non-transparent cellulose was placed between the lowermost of the decor sheets and the uppermost of the three core paper sheets impregnated with phenol-formaldehyde resin.

The U-sheet was monochromatic with color harmonizing with the decor sheets.

The U-sheets were impregnated with melamine-formaldehyde resin and partially cured to the so-called B-stage. No small hard particles were applied to these U-sheets.

By means of the U-sheet, the unaesthetic dark brown a color of the core sheets can be hidden. Therefore, the last decorative sheet of the laminate can stand a higher degree of abrasion before the laminate has to be exchanged.

The abrasion resistance of the decorative laminates obtained was tested in the same way as in EXAMPLE 1. The following values were obtained.

| (a) | 1 + 3 + 1 U-sheet | IP = 10 000 revolutions |
|---|---|---|
| (b) | 1 + 5 + 1 U-sheet | IP = 21 000 revolutions |
| (c) | 1 + 10 + 1 U-sheet | IP = 45 000 revolutions |

The other results were unchanged as compared with Example 8.

EXAMPLE 11

The process according to Example 10 was repeated except that 8 g/m² of hard aluminum oxide particles were applied to the decorative sheets and the natural transparent α-cellulose sheet instead of 3 g/m².

The abrasion resistance of the decorative laminates obtained was tested in the same way as in Example 1. The following values were obtained.

| (a) | 1 + 3 + 1 U-sheet | IP = 20 000 revolutions |
|---|---|---|
| (b) | 1 + 5 + 1 U-sheet | IP = 45 000 revolutions |
| (c) | 1 + 10 + 1 U-sheet | IP = 98 000 revolutions |

The other results were unchanged as compared with Example 10.

EXAMPLE 12

The process according to Example 10 was repeated except that the decor sheets from Example 8, which had been printed by photogravure printing, were used. The same results as in Example 10 were obtained in all aspects.

The invention is not limited to the embodiments shown since these can be modified in different ways within the scope of the present invention.

We claim:

1. A decorative thermosetting laminate with extremely increased abrasion resistance comprising a base layer of cellulosic material or cellulose fibers and at least two patterned decor sheets of paper impregnated with a thermosetting resin and firmly bonded to the base layer, the paper material of these decor sheets being transparent, wherein these sheets are provided with the same pattern and placed n top of each other in such a manner that the corresponding parts of the pattern of the sheets coincide fully with each other, whereby the pattern at abrasion of one decor sheet will be repeated in the next decor sheet.

2. A laminate according to claim 1, wherein the paper material of the decor sheets consists of α-cellulose.

3. A laminate according to claim 2, wherein the paper sheets are calandered to make the printing possible.

4. A laminate according to claim 1, which comprises also natural unpatterned transparent paper sheets impregnated with thermosetting resin.

5. A laminate according to claim 4, wherein the unpatterned, transparent paper sheets are placed between the patterned transparent decor sheets of paper.

6. A laminate according to claim 1, wherein at least one unpatterned transparent paper sheet is placed as the uppermost sheet in the laminate.

7. A laminate according to claim 1, wherein at least one of the patterned or unpatterned transparent paper sheets before the bonding step has been impregnated with a thermosetting resin and coated with small, dry and hard particles evenly distributed over the resin coated surface, whereupon the resin has been dried.

8. A laminate according to claim 7, wherein the hard particles consist of silica, alumunium oxide and/or silicon carbide.

9. A laminate according to claim 7, wherein the hard particles have an average particle size of about 1-80 μm.

10. A laminate according to claim 1, wherein the base layer consists of a particle board or a fiber board.

11. A laminate according to claim 1, wherein the base layer consists of one or more paper sheets impregnated with a thermosetting resin, which sheets have been bonded together and with the transparent paper sheets by curing under heat and pressure.

12. A laminate according to claim 9, wherein the hard particles have an average particle size of about 5-60 μm.

* * * * *